United States Patent [19]

Reed, III

[11] Patent Number: 5,363,152

[45] Date of Patent: Nov. 8, 1994

[54] SELECTIVE COLOR ENHANCEMENT OPTICAL GLASSES

[76] Inventor: Clurin B. Reed, III, 105 Camelia Way, Brandon, Miss. 39042

[21] Appl. No.: 985,271

[22] Filed: Dec. 3, 1992

[51] Int. Cl.⁵ ............................................. G02C 9/00
[52] U.S. Cl. ....................................... 351/47; 351/57; 351/165
[58] Field of Search .................. 351/44, 45, 46, 47, 351/165, 57, 158

[56] References Cited

U.S. PATENT DOCUMENTS

| | | | |
|---|---|---|---|
| 3,586,423 | 6/1971 | Zeltzer | 351/44 |
| 3,701,590 | 10/1972 | Zeltzer | 351/44 |
| 3,731,993 | 5/1973 | Piringer | 351/165 |
| 3,877,797 | 4/1975 | Thornton, Jr. | 351/44 |
| 4,300,819 | 11/1981 | Taylor | 351/44 |

Primary Examiner—William L. Sikes
Assistant Examiner—Hung Xuan Dang
Attorney, Agent, or Firm—John C. Garvin, Jr.; Harold W. Hilton

[57] ABSTRACT

An optical filter which blocks a substantial portion of a selected color of the visual light spectrum from entering one eye. The selected portion is the normal color of an object which is to be viewed by both eyes. The other eye is simultaneously allowed to have a substantial portion of the selected color to enter it. When used to aid a hunter in tracking a blood trail, a substantial portion of the red color (more than 50%) of the blood is blocked from entering one eye while the other eye is allowed to receive a substantial portion (more than 50%) of the red color.

19 Claims, 1 Drawing Sheet

SELECTIVE COLOR ENHANCEMENT OPTICAL GLASSES

FIELD OF THE INVENTION

The present invention relates to optical filters and more specifically to such optical fillers which will enhance color discrimination between different colored objects.

BACKGROUND OF THE INVENTION

Eyeglasses are known in the art which are provided with color enhancing lens. Some such type of eyeglasses are disclosed in U.S. Pat. Nos. 3,586,423 and 3,701,590 issued to Harry I. Zeltzer respectively on Jun. 22, 1971 and Oct. 31, 1972, and are directed to eyeglasses which aid color blind viewers. The eyeglasses include a single red corneal contact lens which covers only one eye and which transmits light only in the red zone while simultaneously permitting the "uncovered" eye to receive the color deficient image of an object which is normally associated with color blindness.

U.S. Pat. No. 4,300,819 issued to Donald E. Taylor on Nov. 17, 1981 is directed to eyeglasses similar to that disclosed in the above-discussed Zeltzer patents but provides the lens with reflective surfaces to make the colored lenses worn by a color blind person appear conventional so that "other observers will be unable to discern that the eyeglasses are specially made for color blindness or that they employ lens elements of different colors."

The present invention is directed to a color enhancing lens disposed for covering at least one eye of an observer (wearer). The other eye of the observer, which is non-color enhanced, may be left uncovered, or covered with a lens which will pass more than fifty percent of the wavelength of a selected color which is to be enhanced (highlighted). The color enhancing lens allows passage, to the eye, of a predetermined percentage (minor portion—less than fifty percent) of reflected light of the selected wavelength from the same object to the eye of the observer. The brain, in its attempt to make sense of this conflict interprets the difference as a quickly flickering reflection from the object which is of the selected wavelength. The color enhancing lens is itself provided with a selected color which will block substantially all portions of the visible light color spectrum except the selected portion of the spectrum in which the object reflects. For example, for seeing red, the color enhancing lens would be blue, cyan or green having the ability to limit the red portion of the color spectrum (that part of the spectrum between 6000 angstroms and 7000 angstroms) to, preferably, between 10% to 30% of the red passing the lens (filter). The other eye could be left unaided or covered with a lens that would preferably pass from 70% to 100% of the red portion of the color spectrum, between 6000 angstroms and 7000 angstroms.

A particular application of this principle is set forth wherein a pair of eyeglasses is provided with a lens which permits a wounded animal (such as a deer) to be tracked by a hunter. Sometimes, a hunter may only wound a deer or other hunted animal and the only way to recover the animal is to track the blood trail of the wounded animal. The principles of the present invention contemplates a frame (such as an eyeglass frame, for example) which supports a lens which blocks a major portion of reflected light in the red (blood colored) portion of the visible light color spectrum to one eye, while allowing a major portion of the light in the red portion of the visible light color spectrum to be received by the other eye.

Typically, when one eye receives a color image, the brain expects the same reception from the other eye with only a slight deviation as to reception angle and very slight color or shading due to the slightly different viewing angles of the eyes. These two differences provide for depth perception.

The device of the present invention provides a different problem for the brain to interpret. One eye is seeing one color (red, for example) and is sending this signal to the brain. The other eye, because of the limiting filter over it, is seeing the same object but is sending a vastly different color interpretation to the brain (dark red to black, for example). The brain, in its attempt to make sense of this conflict, seems to alternate rapidly between the two different colored images, and, in doing so, the perception is a quickly flickering color in the same position. When used as an aid in tracking a trail of blood left by a wounded animal, the device of the present invention allows a person to detect red on green or brown grass in very small quantities even when the ground is wet from dew. The device is also an improvement over the use of flashlights or lanterns in blood tracking since the artificial light makes everything shine.

By proper selection of the lens one can provide a color enhancing lens system which will work for other colors. To achieve this result, it is necessary to select a color filter for one eye that will preferably block from 70% to 90% of the color to be highlighted. The other lens for the other eye is selected to preferably pass 70% to 100% of the same color. In this manner all colors in the visible spectrum can be selectively highlighted to the observer. Also, the lens that is non-blocking of the desired color can be selected so as to block or subdue other undesired colors to further enhance the reception and detection of the desired color.

DETAILED DESCRIPTION OF THE INVENTION

Figure 1:
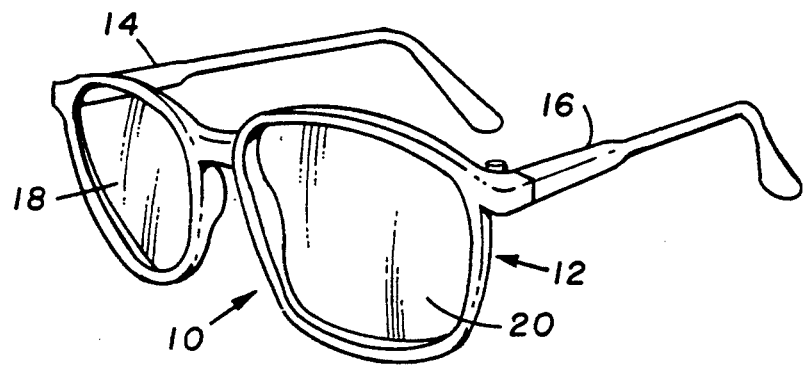
FIG. 1 is a pictorial view of a pair of eyeglasses employing the principles of the present invention.

FIG. 1 illustrates an embodiment of the present invention wherein a pair of eyeglasses 10 is provided with a frame 12 having ear pieces 14 and 16 and a pair of lens 18 and 20. In this embodiment, lens 18 is color enhanced to pass a minor portion, preferably about 10% to 30% of a color of selected wavelength, whereas lens 20 is clear or of a color which preferably passes about 70% to 100% of the same color.

When used as an aid in highlighting the color red, for example, lens 18 would be blue, cyan or green. As stated, supra, this is particularly adapted for use as an aid to a hunter when following a blood trail left by a wounded animal.

Figure 2:
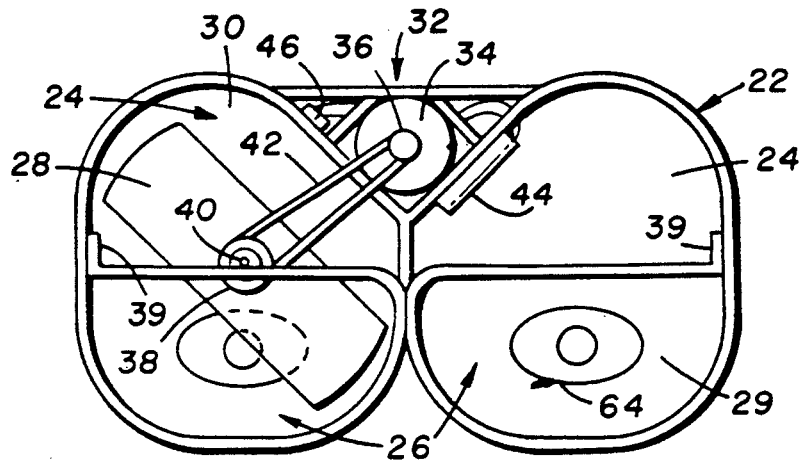
FIG. 2 is a front view of an embodiment of the present invention which uses a movable color enhancement lens. The lens permits intermittent viewing of an object which provides a glistening effect.

FIG. 2 illustrates an embodiment of the invention which permits intermittent viewing of an object. The eyeglass assembly is in the form of goggles and includes a frame 22 having upper sections 24 and lower sections 26. A color enhancing lens 28 is mounted in a section 30 of the goggle assembly. Lens 28 is a movable (rotatable) lens which is periodically rotated past one eye of the observer, to provide intermittent viewing of the object. In practice, it was apparent that such intermittent viewing provided a glistening effect to the blood trail thus enabling the hunter to follow the blood trail more readily. The other lens 29 is clear or is of a color to permit the major (over 50%) of the color of the object to reach the other eye. An actuating mechanism 32 is mounted in the upper portion 24 of frame 22 and includes a DC electric motor 34 having a rotatable output shaft 36. Lens 28 is shown to be mounted to a rotatable wheel 38 which is secured to a stub shaft 40 secured to a bracket 39 supported in frame 22. A belt 42 connects wheel 38 to output shaft 36 for rotation therewith. The lens is an elongated flat strip which is rotated past the viewer's eye. A battery 44 is connected to the DC motor for electrically energizing the motor. A variable resistor 46 for controlling the rate of rotation of the motor may be provided.

Figure 3:
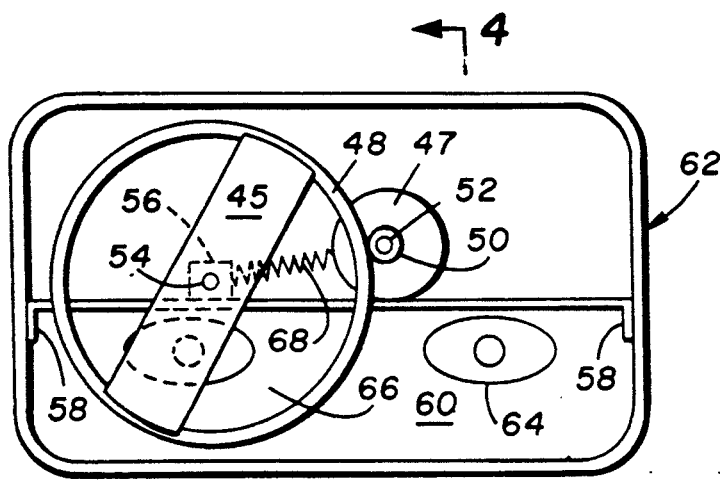
FIG. 3 is a view similar to FIG. 2 of another embodiment of the present invention.
Figure 4:
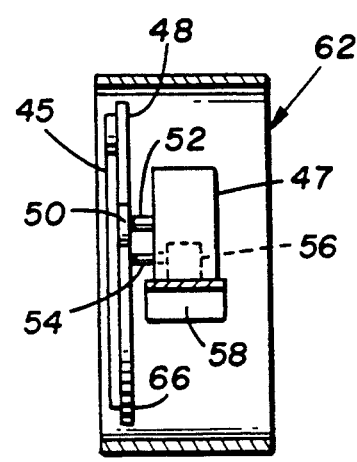
FIG. 4 is a side elevational view of the embodiment of FIG. 3.

FIGS. 3 and 4 illustrate an embodiment wherein a movable lens 45 is rotated by a DC motor 47 as described above. However, in this embodiment, lens 45 is mounted to an annular member or wheel 48 which is in engagement with a wheel 50 secured to motor output shaft 52. Wheel 48 is secured to a shaft 54 which extends from a support member 56 secured to a bracket 58 which extends across the lower portion 60 of a goggle frame 62. The lower portion 60 is adjacent the eyes 64 of the wearer. The wheel is open in the middle 66 to permit the wearer to see through lens 45. A spring 68 has one end connected to the support member 56 and a second end secured to motor 47. The spring 68 biases the wheel 50 of motor 47 and lens supporting wheel 48 together to maintain wheel 48 and wheel 50 in snug fitting engagement.

It is to be understood that while the color red has been specifically discussed herein, the lens has application to different colors. In such application, a color filter is selected for one eye that will block a major portion, preferably about 70% to 90% of the color to be highlighted. A clear or colored lens may be provided for the other eye that will pass a major portion, preferably about 70% to 100% of the same color, or the eye may be left uncovered.

The selective color enhancing device of the present invention provides the following advantages when used by a hunter in following a blood trail.

a. It is small and lightweight.

b. It works in sunlight and in shaded conditions, and will work after dark with the light from a standard flashlight.

c. It detects blood because of its color, therefore, it works on blood that is partially dissolved or somewhat diluted because of dew or rain.

d. It detects blood that is wet or dry.

e. It detects blood on damp grass, leaves or soil, since it highlights red and is not hindered by the shine from the moisture.

f. It will detect very small droplets of blood against a background of green wheat or dark brown to black soil.

This feature is further enhanced by using a blue filter over the non-red limiting eye that will allow the red to enter but will darken or alter the color of the background.

g. It makes it easy to spot (or see) Hunter Orange or BLAZE Orange while it is being used. Orange is highlighted along with red since it is very near (next to) red on the color spectrum. This is a good hunter safety aspect of the invention.

h. It may be useful in finding lost hunters in the woods from the ground, or from aircraft, if the hunter is wearing Hunter Orange.

The invention is best practiced in the form of eyeglasses (spectacles). The glasses should be of the sporting sun glass type with optical quality lens. There should be clip-ons available also. Glasses can be made in prescription and in non-prescription lens. The plastic lens are to be of optical quality and should be dyed to specifications while the plastic is in the molten stage. The dye should be optical quality, aniline type, and give the desired filtering and selective color range transmission properties to the lens. The color and characteristics are determined by the targeted portion of the visible light color spectrum that the observer wishes to select or highlight. The lens over the other eye (the non-critical lens) can be customized to subdue, alter or diminish selected colors but it must allow at least 50% more of the desired target color to pass than does the critical lens.

Optical quality plastic that is dyed while in the molten stage is preferred for manufacture of the lens; however, a lens dipping process may be used whereby a clear optical grade plastic lens is dipped into a heated vat of dye. Aniline dyes and catalytic molecular dyes may be resorted to in order to provided the proper color filtering.

The invention can be practiced in the form of goggles, if desired, with a head band attachment device and color filter plastic lens.

The invention can also be practiced in the form of a monocle, with a securing strap. This would limit the advantages of altering background colors with other lens. If desired, the lens concept of the present invention may be combined with or as a part of binoculars generally carried by hunters.

I claim:

1. A method for enhancing the perception of the true color of an object, said true color being in a selected portion of the visible light spectrum, said method comprising the steps of positioning a filtering lens adjacent one eye that blocks a first predetermined portion of said selected portion of the visual light spectrum which contains said true color of said object from entering said one eye and simultaneously allowing a second predetermined portion of the same selected portion of the visible light spectrum to enter the second eye, said first predetermined portion being less than said second predetermined portion containing the true color of said object.

2. The method of claim 1 wherein said first predetermined portion of light from said object is in the range of 10% to 30% of the transmitted light from said object.

3. The method of claim 2 wherein said second predetermined portion of light from said object entering said other eye is in the range of 70% to 100% of the transmitted light.

4. The method of claim 3 wherein said lens is dyed to have a color which is a different color than the color in the selected portion of the visible light spectrum so that a substantial portion of the selected color is prevented from reaching the observer's said one eye.

5. The method of claim 3 wherein said lens is provided with a color which has a shorter wavelength than the wavelength of the selected color of the visible light color spectrum.

6. The method of claim 5 wherein said lens color is selected from one of or a combination of blue, cyan or green for limiting the red portion of the visible color spectrum to between 10% and 30% of the red passing through said lens.

7. An eyeglass having at least one lens disposed for enhancing the perception of the true color of an object, said color being in selected areas of the visible light color spectrum, said eyeglass comprising:
- a lens supporting frame;
- at least one lens mounted in said frame, said lens adapted for positioning between said object and one eye of an observer, said lens being provided with filter means to prevent a first predetermined portion of a selected portion of the visual light color spectrum which is reflected from said object, and is the true color of said object, from entering said one eye while allowing a second predetermined portion of the reflected true color of said object to enter the other eye, whereby the true color of said object is enhanced.

8. An eyeglass as set forth in claim 7 wherein said first predetermined portion of the selected portion of the visual light color spectrum is in the range of 10% to 30% of said reflected light from said object.

9. An eyeglass as set forth in claim 8 wherein said second predetermined portion of the selected portion of the visual light color spectrum entering said other eye is in the range of 70% to 100% of said reflected light from said object.

10. An eyeglass as set forth in claim 9 wherein said lens is provided with a color which has a wavelength below the frequency of the wavelength of the selected portion of the visible color spectrum.

11. An eyeglass as set forth in claim 10 wherein lens color is selected from one of of a combination of blue, cyan or green for limiting the red portion of the visible color spectrum to between 10% and 30% of the red passing through the lens.

12. Am eyeglass as set forth in claim 11 wherein said lens is movably mounted in said frame for intermittent positioning between the eye of the observer and said object whereby said reflected light reaches the observer's eye in intermittent intervals.

13. An eyeglass as set forth in claim 12 including actuating means operatively connected to said lens to impart rotational movement thereto; and, energizing means for electrically actuating said actuating means.

14. An eyeglass as set forth in claim 14 wherein said actuating means includes an electric motor having an output shaft, connecting means disposed between said lens and said output shaft for movement of said lens past the eye of the observer in periodic fashion.

15. An eyeglass as set forth in claim 14 wherein said frame includes mounting means for supporting said lens, said actuating means, and said energizing means.

16. A device for aiding a hunter in tracking a wounded animal by enhancing perception of the red color of animal's blood left by a bleeding animal, said device comprising:
- a frame adapted for positioning between the eyes of the hunter and the blood trail;
- lens means carried by said frame and including at least one lens adapted for positioning over one eye, said lens means being provided with filtering means for filtering out and blocking entry into said one eye a first predetermined portion of red emanating from the blood while simultaneously allowing a second predetermined portion of red emanating from the same portion of the blood to enter the other eye, said first predetermined portion being less than said second predetermined portion of the transmitted light from said object.

17. A device as set forth in claim 16 wherein said at least one lens is selected from the colors of blue, cyan or green, singly or in combination, for limiting the red color emanating from said blood to between 10% and 30% passing through said at least one lens.

18. A device as set forth in claim 16 wherein said first predetermined portion is in the range of 10% to 30% of the transmitted light from said object.

19. A device as set forth in claim 16 wherein said second predetermined portion is in the range of 70% to 100% of the transmitted light from said object.

* * * * *